US006910601B2

(12) United States Patent
Thomas et al.

(10) Patent No.: US 6,910,601 B2
(45) Date of Patent: Jun. 28, 2005

(54) COLLATING UNIT FOR USE WITH A CONTROL CENTER COOPERATING WITH AN AUTOMATIC PRESCRIPTION OR PHARMACEUTICAL DISPENSING SYSTEM

(75) Inventors: Tracy I. Thomas, Overland Park, KS (US); Michael E. Coughlin, Mission Hills, KS (US)

(73) Assignee: ScriptPro LLC, Mission, KS (US)

( * ) Notice: Subject to any disclaimer, the term of this patent is extended or adjusted under 35 U.S.C. 154(b) by 177 days.

(21) Appl. No.: 10/615,503

(22) Filed: Jul. 8, 2003

(65) Prior Publication Data

US 2004/0039482 A1 Feb. 26, 2004

Related U.S. Application Data

(60) Provisional application No. 60/394,589, filed on Jul. 8, 2002.

(51) Int. Cl.[7] ................................................ B65G 59/00
(52) U.S. Cl. ....................................... 221/119; 700/244
(58) Field of Search ................................ 221/119, 123, 221/253; 700/244

(56) References Cited

U.S. PATENT DOCUMENTS

| | | | |
|---|---|---|---|
| 341,045 | A | 11/1886 | Igel et al. |
| 1,128,561 | A | 2/1915 | Webendorfer |

(Continued)

FOREIGN PATENT DOCUMENTS

| | | |
|---|---|---|
| AU | 99676775 | 5/1997 |
| DE | 4235047 | 4/1994 |
| EP | 282785 A | 9/1988 |
| EP | 0471530 | 12/1991 |
| EP | 0827733 | 8/1997 |
| EP | 0924676 | 10/1998 |
| FR | 1449591 | 8/1966 |
| GP | 2109137 | 5/1983 |
| JP | 53145260 | 12/1978 |
| JP | 0043743 | 3/1984 |
| JP | 3031965 | 2/1991 |
| JP | 3240602 | 10/1991 |

(Continued)

OTHER PUBLICATIONS

Guerra, Lawrence E.; U.S. Appl. No. 10/896,477; filed Jul. 22, 2004; Fork Based Transport Storage System for Pharmaceutical Unit.

(Continued)

*Primary Examiner*—Kenneth Noland
(74) *Attorney, Agent, or Firm*—Hovey Williams LLP

(57) ABSTRACT

A collating unit (10) for use with a control center (12) cooperating with an automatic dispensing system ("ADS") (14) for automatic storage of prescription containers dispensed from the ADS (14). The collating unit (10) broadly comprises an infeed conveyor (16) for transporting the prescription containers from the ADS (14) to the collating unit (10); a base (18) housed within the control center (12) and positioned generally adjacent to the infeed conveyor (16); a collating unit conveyor (20) mounted on the base (18); a frame (21) substantially surrounding and covering the infeed conveyor (16) and the base (18); a plurality of holding areas (22) formed within the frame (21); a plurality of guide arms (24) mounted on the base (18) between the infeed conveyor (16) and the collating unit conveyor (20) and operable to maneuver the containers from the infeed conveyor (16) into the plurality of holding areas (22); a plurality of sensors (26) to sense the presence of the containers within the collating unit (10); and a control system (28) for controlling operation of the infeed conveyor (16), the collating unit conveyor (20), the guide arms (24), and the sensors (26).

21 Claims, 7 Drawing Sheets

U.S. PATENT DOCUMENTS 2,088,038 A 7/1937 Scott et al.
2,137,501 A 11/1938 Myers
2,178,000 A 10/1939 Slehrs
2,348,927 A 5/1944 Runsvold et al.
2,690,856 A 10/1954 Trondle
2,781,947 A 2/1957 Webster et al.
2,929,532 A 3/1960 Tonelli
3,045,864 A 7/1962 Hurst et al.
3,069,654 A 12/1962 Hough
3,166,177 A 1/1965 Laverty
3,193,196 A 7/1965 Merrill et al.
3,206,062 A 9/1965 Rappaport
3,215,310 A 11/1965 Hurst et al.
3,277,998 A 10/1966 Medoff
3,368,713 A 2/1968 Hurst et al.
3,400,857 A 9/1968 Schubert
3,603,327 A 9/1971 Buchholz et al.
3,677,437 A 7/1972 Haigler
3,692,211 A 9/1972 Flubacker
3,719,288 A 3/1973 Schmitt et al.
3,746,211 A 7/1973 Burgess, Jr.
3,782,590 A 1/1974 Apfel
3,823,844 A 7/1974 Linkemer et al.
3,837,139 A 9/1974 Roseberg
3,871,156 A 3/1975 Koenig et al.
3,885,702 A 5/1975 Joslin et al.
3,917,045 A 11/1975 Williams et al.
3,921,196 A 11/1975 Patterson
3,985,264 A 10/1976 Shaw et al.
3,997,063 A 12/1976 Adams et al.
4,013,192 A 3/1977 Pillon
4,018,358 A 4/1977 Johnson et al.
4,247,019 A 1/1981 Lerner
4,264,396 A 4/1981 Steward
4,284,301 A 8/1981 Geiger et al.
4,386,860 A 6/1983 Price et al.
4,468,277 A 8/1984 Kontz
4,476,381 A 10/1984 Rubin
4,546,901 A 10/1985 Buttarazzi
4,615,350 A 10/1986 Boudville
4,660,824 A 4/1987 Hermkens et al.
4,714,515 A 12/1987 Hoffmann
4,753,473 A 6/1988 Arnett
4,787,803 A 11/1988 van Elten et al.
4,803,487 A 2/1989 Willard et al.
4,810,230 A 3/1989 Shirasawa
4,811,764 A 3/1989 McLaughlin
4,812,629 A * 3/1989 O'Neil et al. ............... 235/383
4,835,372 A 5/1989 Gombrich et al.
4,851,072 A 7/1989 Kontz
4,857,716 A 8/1989 Gombrich et al.
4,868,409 A 9/1989 Tanaka et al.
4,869,394 A 9/1989 Hurst
4,872,803 A 10/1989 Asakawa
4,902,263 A 2/1990 Ito et al.
4,918,604 A 4/1990 Baum
4,954,817 A 9/1990 Levine
4,958,280 A 9/1990 Pauly et al.
5,007,085 A 4/1991 Greanias et al.
5,033,785 A 7/1991 Woolley, Jr.
5,082,268 A 1/1992 Santoro
5,194,857 A 3/1993 Gomez
5,208,762 A 5/1993 Charhut et al.
5,323,677 A 6/1994 Knutson
5,332,275 A 7/1994 Conway et al.
5,335,664 A 8/1994 Nagashima
5,337,919 A 8/1994 Spaulding et al.
5,348,061 A 9/1994 Riley et al.
5,401,059 A 3/1995 Ferrario
5,453,759 A 9/1995 Seebach
5,463,839 A 11/1995 Stange et al.
5,481,265 A 1/1996 Russell
5,493,805 A 2/1996 Penuela et al.
5,512,879 A 4/1996 Stokes
5,562,232 A 10/1996 Pearson
5,597,995 A 1/1997 Williams et al.
5,621,384 A 4/1997 Crimmins et al.
5,629,981 A 5/1997 Nerlikar
5,671,592 A 9/1997 Yuyama et al.
5,682,032 A 10/1997 Philipp
5,700,998 A 12/1997 Palti
5,706,026 A 1/1998 Kent et al.
5,713,485 A 2/1998 Liff et al.
5,713,487 A 2/1998 Coughlin
5,718,525 A 2/1998 Bruhnke et al.
5,720,154 A * 2/1998 Lasher et al. ................ 53/411
5,762,235 A 6/1998 Coughlin
5,771,657 A 6/1998 Lasher et al.
5,781,511 A 7/1998 Yasukawa et al.
5,797,515 A 8/1998 Liff et al.
5,798,020 A 8/1998 Coughlin et al.
5,812,410 A 9/1998 Lion et al.
5,832,296 A 11/1998 Wang et al.
5,845,264 A 12/1998 Nellhaus
5,860,563 A 1/1999 Guerra et al.
5,873,488 A 2/1999 Guerra
5,883,370 A 3/1999 Walker et al.
5,884,806 A 3/1999 Boyer et al.
5,897,024 A 4/1999 Coughlin et al.
5,903,225 A 5/1999 Schmitt et al.
5,907,493 A 5/1999 Boyer et al.
5,959,530 A 9/1999 Lupien, Jr. et al.
5,963,453 A 10/1999 East
6,006,946 A 12/1999 Williams et al.
D418,494 S 1/2000 Robb
6,036,017 A 3/2000 Bayliss, IV
6,036,812 A 3/2000 Williams et al.
6,039,251 A 3/2000 Holowko et al.
6,070,140 A 5/2000 Tran
6,075,189 A 6/2000 Robb
6,085,938 A 7/2000 Coughlin
6,119,737 A 9/2000 Yuyama et al.
6,155,485 A 12/2000 Coughlin et al.
6,161,721 A 12/2000 Kudera et al.
6,206,590 B1 3/2001 Thomas et al.
D440,570 S 4/2001 Schneider
6,225,988 B1 5/2001 Robb
6,249,277 B1 6/2001 Varveris
6,310,542 B1 10/2001 Gehlot
6,318,630 B1 11/2001 Coughlin et al.
6,320,570 B2 11/2001 Robb
6,343,711 B1 2/2002 Coughlin
6,346,886 B1 2/2002 De La Huerga
D458,933 S 6/2002 Schneider
6,421,584 B1 7/2002 Norberg et al.
6,477,442 B1 11/2002 Valerino, Sr.
6,478,185 B2 11/2002 Kodama et al.
6,526,158 B1 2/2003 Goldberg
6,533,480 B2 3/2003 Schneider
6,564,104 B2 5/2003 Nelson et al.
6,574,580 B2 6/2003 Hamilton
6,575,596 B2 6/2003 Butt
6,578,734 B1 6/2003 Coughlin
6,587,090 B1 7/2003 Jarra
6,592,005 B1 7/2003 Coughlin et al.
6,600,418 B2 7/2003 Francis et al.
6,624,739 B1 9/2003 Stobbe
6,692,211 B2 2/2004 Yuyama et al.
6,695,207 B1 2/2004 Norris, Jr.
6,703,918 B1 3/2004 Kita
6,724,690 B1 4/2004 Endo et al.

| | | | |
|---|---|---|---|
| 6,774,796 | B2 | 8/2004 | Smith |
| 2003/0142588 | A1 | 7/2003 | Kawatahara |

FOREIGN PATENT DOCUMENTS

| | | | |
|---|---|---|---|
| JP | 4174061 | | 6/1992 |
| JP | 6127635 | | 5/1993 |
| JP | 6315521 | | 11/1994 |
| JP | 7187165 | | 7/1995 |
| JP | 8007058 | | 1/1996 |
| JP | 8115376 | | 5/1996 |
| JP | 9034964 | | 2/1997 |
| JP | 9202301 | | 8/1997 |
| JP | 9231342 | | 9/1997 |
| JP | 09259344 | A | 10/1997 |
| JP | 11296727 | A | 10/1997 |
| JP | 10059336 | | 3/1998 |
| SU | 918086 | | 4/1982 |
| WO | 9422580 | | 10/1994 |
| WO | 9529455 | | 11/1995 |
| WO | 9809598 | | 3/1998 |

OTHER PUBLICATIONS

Coughlin, Michael E.; U.S. Appl. No. 09/457,286; filed Dec. 8, 1999; Automatic Dispensing System for Unit Medicament Packages.

Knutsen, Bernhard P.; U.S. Appl. No. 10/869,595; filed Jun. 16, 2004; RFID Tag and Method of User Verification.

Fred Levit, Daniel Garside; Computer–Assisted Prescription Writing; Dec. 30, 1976.

National Institutes of Health; Prescription–Writing with a PC; Jun. 10, 2003.

Packaging Week Interpak; Integrated Cartoning and Labeling System; Jul. 1996.

Roerig, CS; Assembly Automation; Automatic Pharmaceutical Inspection; 1993.

Alton Rosemary; Assembly Automation; Verification of Automated Pack Assembly; 1993.

Chain Store Age Executive; Longs Drug Stores' Systems Prescription; Dec. 1996.

Ukens, Carol; Drug Topics; Rx Description of Product Label Aids Accuracy.

McHugh, James A.; Phillips, Alexander J.; Computers in Healthcare; Managed–Care Pharmacy: An Integrated MIS Approach.

JICST; Development of a Printing System of Drug Envelope Labels with Personal Computer and Experience of Its Usage.

Journal of Public Policy & Marketing; Comprehension Testing for OTC Drug Labels; Goals, Methods, Target Population, and Testing Environment.

Kalsher, Michael J.; Proceedings of the Human Factors and Ergonomics Society; Enhancing the Perceived Readability of Pharmaceutical Container Labels and Warnings: the Use of Alternative Designs and Pictorials.

Fluid Phase Equilbria; Pharmaceutical Container Labels: Enhancing Preference Perceptions with Alternative Designs and Pictorials.

Department of Clinical Pharmacy; A Survey of Prescription Label Preferences Among Community Pharmacy Patrons.

American Journal of Hospital Pharmacy; Effect of Call–In Prescription Refill System on Workload in an Outpatient Pharmacy.

Department of Mathematical Statistics and Operation Research; Retail Pharmacy Activities and Their Automation by Bar Code Recorder, Tablet Counter and Remote Computer.

Bohsel Pharmacy Co. Ltd.; Computerized Prescription Checking System.

Business Forms, Labels & Systems; Label/Tag.

Converting Magazine; A Prescription for Supplying the Pharmaceutical Industry.

Ursula Jones; How to Get More from your Label.

American Society of Consultant Pharmacist; White Paper on Automation in Pharmacy.

* cited by examiner

COLLATING UNIT FOR USE WITH A CONTROL CENTER COOPERATING WITH AN AUTOMATIC PRESCRIPTION OR PHARMACEUTICAL DISPENSING SYSTEM

RELATED APPLICATION

This non-provisional utility application relates to and claims the priority benefit of U.S. provisional application entitled "COLLATING CONTROL CENTER," Ser. No. 60/394,589, filed Jul. 8, 2002, which is hereby incorporated into the present non-provisional application by reference.

BACKGROUND OF THE INVENTION

1. Field of the Invention

The present invention relates to automatic dispensing systems that are operable to automatically fill and label prescription vials or otherwise dispense pharmaceutical products to be labeled and dispensed as prescriptions to patients. More particularly, the invention relates to a collating unit operable to automatically store prescription containers dispensed from an automatic dispensing system for subsequent retrieval by an operator.

2. Description of the Prior Art

Automatic dispensing systems ("ADSs"), such as the one disclosed in U.S. Pat. No. 5,337,919, have been developed to assist pharmacists in the filling and dispensing of prescriptions. ADSs are extremely helpful in automatically filling prescription vials with medicaments or automatically dispensing unit-of-use packages containing medicaments. However, busy pharmacies often do not have enough pharmacists, technicians, or other operators available to retrieve and store the vials and packages, i.e. the prescription containers, as quickly as an ADS outputs the containers. It is therefore common for prescription containers to be lined up on an outfeed conveyor of the ADS, waiting for retrieval and storage by the operator. When the operator wishes to retrieve a particular patient's container, the operator must look at and read a label of each container on the outfeed conveyor until finding the correct container. This method of retrieving prescription containers is time-consuming and presents a possibility for error, since the operator may easily pick up the wrong container in search of the patient's container. If the patient has several filled prescriptions corresponding to several containers, the operator must look through even more containers for the patient's containers. Further, if the ADS is filling the containers faster than the operator can retrieve the containers, place caps on the containers that are filled prescription vials, and store the containers, then the operator may likely store the containers on a counter top in the pharmacy. This presents the possibility of containers becoming disorganized, or of even more concern, containers being knocked over. If the containers are filled prescription vials, then since the vials are not yet capped when they exit the ADS, then medicaments may spill from toppled vials onto the counter top or onto the floor. Further, there is the possibility other items may inadvertently be placed in the vials, such as other medicaments or particulates, such as dust accumulated on the counter top or floor.

If the pharmacy does provide multiple pharmacists, technicians, or other operators to retrieve and store the prescription containers exiting the ADS, one or more persons are necessarily moving around the outfeed conveyor of the ADS. Since the area around the conveyor is relatively small, these persons are likely to bump into each other or otherwise cause a disruptive work environment. Further, with multiple persons retrieving the containers, the containers may become misplaced, or the contents of filled prescription vials may be spilled. It is also possible that one or more of the containers dispensed for a given patient may be retrieved by one operator while other container(s) for the same patient may be retrieved by another operator. This may cause confusion, and when this happens, the patient may inadvertently leave the pharmacy without all of the required prescription containers. Requiring additional operators for managing retrieval and storage of the containers also increases the overall operating costs of the pharmacy.

Once the operator finds the correct container for the patient, the container is usually packaged in a bag having a label identifying the patient's name for whom the container is intended, a prescription number for the prescription associated with the container, and other relevant and identifying information for the prescription. If the patient requires multiple containers, all containers would normally be packaged in the same bag. A prescription label for each prescription stored in the bag is then normally stapled to the bag. The bag is then stored, normally in alphabetical order, in a bin or other storage receptacle. As bags for various patients are stored in the bin, the bags are bunched together, which often makes it difficult to find a bag for a particular patient. Further, if a bag is mistakenly placed in the bin out of alphabetical order, upon retrieval of the bag, the operator is required to conduct a more extensive search of the stored bags for the desired bag.

If the patient has several prescriptions corresponding to several filled containers, all the containers should be packaged in the same bag for retrieval by the operator. However, it is common for multiple prescription containers to be packaged in separate bags for a variety of reasons. For example, if prescriptions are entered into a control system of the ADS at separate times, as opposed to being entered at approximately the same time, then the containers containing the prescribed medicament will exit the ADS at separate intervals. The operator retrieving the containers from the ADS outfeed conveyor will then likely package the containers as they exit the ADS, as opposed to retrieving a container for a patient, recognizing that other containers will be forthcoming from the ADS, and temporarily setting the retrieved container aside to wait for the other containers for the patient to exit the ADS. When the last container for the patient has exited the ADS, the operator must then retrieve all containers for the patient that have been set aside, package the containers in a bag, and store the bag in alphabetical order in the storage bin. If the operator sets aside multiple containers for multiple patients, the counter top of the pharmacy is likely to become full with prescription containers awaiting packaging, which increases the possibility of misplacing a container or of even more concern, incorrectly packaging a container in the wrong bag.

To alleviate some of the problems associated with retrieving dispensed prescription containers, ADSs are often provided with a control center or other end unit, wherein prescription containers filled with medicaments are conveyed to the control center via the outfeed conveyor of the ADS. Most prior art control centers are static in that they are simply a cabinet or handling station at which the operator retrieves a filled container from the outfeed conveyor, places a cap on the container if it is a filled prescription vial, packages the container in a bag or other package, and stores the container in a storage receptacle or bin based on a patient's name.

Automated control centers have been developed which are operable to automatically store the containers exiting the ADS. Such automated control centers commonly include a storage unit having a plurality of holding slots, holding areas, or other storage mechanism in which the prescription containers are stored. Unfortunately, prior art automated control centers are limited to storing only one prescription container per a slot or compartment. Additionally, prior art automated control centers store the container based on a prescription number associated with the container, as opposed to storing the container based on a patient name for whom the container is intended. This is especially inconvenient for several reasons. First, many patients now receive more than one prescription at a time, and thus, more than one prescription container will be associated with each patient. Since prior art automated control centers are only operable to store one container per a slot, an operator retrieving stored containers for a patient must retrieve containers from several different slots. Further, because the slots in which the containers for the patient are stored are not necessarily next to each other, or even proximate to each other, the operator is required to look for containers at several various locations within the storage unit.

Second, prior art automated control centers are only operable to store the container for the patient under the prescription number, and thus, any indicator for the slot in which the container is stored only displays the prescription number. The operator is then required to cross-reference the prescription number to the patient name by either viewing the prescription number on paperwork for the prescription, viewing the prescription number on the indicator for the slot, and determining if the numbers match, or viewing the prescription number on a display, such as a computer monitor, and matching the prescription number to the number on the indicator. This is time-consuming and prone to error since the operator must match prescription numbers that are often several digits in length.

As noted above, many ADSs already include static control centers. To automate the static control centers, the static control centers must either be completely replaced with automated control centers having storage units for storing the prescription containers, or the static control centers must be substantially modified to include the storage units. Extensive modification or replacement of the static control centers is required because the storage units for storing the prescription containers are normally large and bulky and include many structural items not found in existing static control centers. Therefore, prior art static control centers cannot be easily and inexpensively modified to include storage units for storing prescription containers.

Another limitation of prior art automated control centers is that they are not configured to simultaneously store both unit-of-use packages containing medicaments and filled prescription vials. This is especially problematic because many medicaments are now pre-packaged in unit-of-use packages, especially in Europe.

Further yet, prior art automated control centers are often relatively expensive, due to their large size and numerous features.

There is therefore a need for an automated storage unit configured to be easily used with an existing static control center. More particularly, there is a need for a storage unit that automatically stores a prescription container containing medicaments and dispensed from an automatic dispensing system for subsequent retrieval by an operator. There is also a need for a unit operable to store more than one container in a holding area. Additionally, there is a need for a unit operable to collate multiple containers for a patient in one holding area. Further, there is a need for a unit operable to store a container for a patient based on the patient's name, as opposed to a prescription number associated with the container. Additionally, there is a need for a unit that is configured to simultaneously store both prescription vials and/or packages containing medicaments in a staging area such that multiple prescriptions for a patient, whether in the form of prescription vials, unit-of-use packages, or a combination thereof, are grouped together for easy retrieval. Even further, there is a need for a unit that is relatively inexpensive.

SUMMARY OF THE INVENTION

The present invention solves the above-described problems and provides a distinct advance in the art of automated storage units for use with static control centers cooperating with automatic dispensing systems ("ADSs"). More particularly, the present invention provides a collating unit that may be used with an existing static control center to automatically store prescription containers, such as prescription vials and unit-of-use packages containing medicaments, exiting an ADS. The unit stores prescription containers according to a storage algorithm that is dependent on a patient name for whom a container is intended and an availability of an open storage position in the collating unit.

The collating unit of the present invention broadly includes an infeed conveyor, a base, a collating unit conveyor, a frame, a plurality of holding areas, a plurality of guide arms, a plurality of sensors, and a control system. The collating unit may be mounted in an opening formed in a counter top of an existing control center or, alternatively, a control center may be manufactured with the collating unit.

The infeed conveyor is preferably positioned on the counter top of the control center and may be an outfeed conveyor of the ADS. The base is preferably mounted within the opening in the counter top and extends into the cavity of the control center. The base is secured to the counter top and provides a stable support structure on which the collating unit conveyor may be mounted. The collating unit conveyor is mounted on the base and is positioned generally adjacent to the infeed conveyor.

The frame substantially surrounds the infeed conveyor and the base and collating unit conveyor. The frame includes a longitudinal slot positioned along a length of the frame, such that when the frame is positioned over the infeed and collating unit conveyors, the longitudinal slot is positioned over the infeed conveyor. The frame also includes the plurality of holding areas formed therein. Each holding area is positioned generally transverse to the longitudinal slot at an angle less than 90° to the longitudinal slot. Each holding area is generally U-shaped to include an open end and a closed end. The open end of each area is interconnected with the longitudinal slot. When the frame is positioned over the infeed and collating unit conveyors, the holding areas are positioned over the collating unit conveyor.

The plurality of guide arms are rotatably mounted to the base between the infeed conveyor and the collating unit conveyor and at the open end of each holding area. The rotation of each arm is driven by an individual guide arm motor in communication with the control system.

The plurality of sensors are operable to determine the presence of a container within the collating unit. Each sensor includes an infrared light emitting diode ("LED") and receiver. Sensors are positioned at an end of the longitudinal slot, at the closed end of each holding area, and along a length of the longitudinal slot proximate to the open end of each holding area.

The control system controls operation of the infeed conveyor, the collating unit conveyor, the plurality of guide arms, and the plurality of sensors. The control system includes a computing device, such as a computer, an infeed conveyor controller, a collating unit conveyor controller, a guide arm controller for each guide arm, a sensor controller for each sensor, a central sensor controller, an input device, an indicia reader, and at least one display, such as a computer monitor. The control system is preferably integrated with a control system of the ADS.

The infeed conveyor controller controls operation of the infeed conveyor and specifically, is operable to instruct movement of an infeed conveyor motor. Similarly, the collating unit conveyor controller controls operation of the collating unit conveyor and is operable to instruct movement of a collating unit conveyor motor.

Each guide arm controller controls operation of its guide arm and specifically, controls operation of its guide arm motor. When a container is ready to be stored in the holding area, the control system instructs the guide arm motor, via the guide arm controller, to open and close the guide arm.

Each sensor is controlled by its sensor controller, and each of the sensor controllers is controlled by the central sensor controller. Thus, the central sensor controller is operable to transmit information to and receive information from each of the sensor controllers.

The input device may be a keyboard, keypad, fingerprint reader, mouse, etc. An operator of the collating unit uses the input device to input identifying information for a patient, such as the patient's name, into the control system to facilitate locating stored containers in the collating unit.

The indicia reader is preferably a bar code reader for scanning a bar code of a prescription for the patient. Paperwork for the prescription preferably includes the bar code identifying the prescription.

The display is preferably a flat screen computer monitor mounted on an outer face of the ADS for easy viewing by the operator.

In operation, a prescription for a patient is entered into the control system of the ADS along with identifying information for the prescription, such as the patient's name. The ADS then dispenses a container containing the prescribed medicament. The container is transported to the control center, and specifically to the collating unit, via the infeed conveyor. The control system next determines in which holding area to store the container. The selected holding area is dependent on whether previous containers for the patient have been stored in the collating unit and not yet retrieved. If containers for the patient have already been stored and not yet retrieved, the control system determines if the holding area has space to store the additional container. To accomplish this, the sensor positioned at the open end of the holding area determines if the holding area is full. If the holding area is not full, the container is stored in the holding area. If the holding area is full, or if no container for the patient has been stored and not yet retrieved, the control system selects the first empty holding area for storage of the container.

To store the container in the holding area, the infeed conveyor moves forward to transport the container to the open end of the selected holding area. As the container progresses to the holding area, the guide arm for the area opens outwardly into the path of the container. Based on the speed of the infeed conveyor and the sensor sensing the presence of the container, the control system knows when the container is positioned at the opening of the holding area. Once the container is positioned at the opening of the holding area, the control system instructs the guide arm to close, which pushes the container into the holding area and onto the collating unit conveyor. To further transport the container to the closed end of the area, the control system instructs the collating unit conveyor to move forward. Since the holding area is positioned at an angle less than 90° to the longitudinal slot, the container is moved to the closed end of the holding area due to the forward progression of the collating unit conveyor.

When an operator of the collating unit desires to retrieve the container from the holding area, the operator may input the identifying information for the prescription, such as the patient's name, into the control system via the input device. Alternatively, the operator may scan the bar code on the paperwork of the prescription using the indicia reader. The control system then instructs an indicator positioned on either side of the frame proximate to the holding area to flash, which indicates the holding area location of the desired container.

By constructing a collating unit as described herein, numerous advantages are realized. For example, the collating unit of the present invention assists pharmacists or other operators in storing containers dispensed by an automatic dispensing system by automatically storing the containers, which significantly reduces the time necessary to manually retrieve and store the containers. Additionally, the collating unit eliminates errors associated with manual retrieval and storage of dispensed containers. Further, the collating unit eliminates the need for multiple pharmacists or operators to retrieve and store the containers, thus decreasing the operating costs of the pharmacy. Further yet, the collating unit is operable to store more than one prescription container per a holding area.

The collating unit is also operable to associate a stored container with a patient based on the patient's name. Further, the collating unit of the present invention can collate and store multiple containers for a patient within the same area. Further yet, the collating unit may be used with an existing control center and is relatively inexpensive, thus providing a pharmacy with an inexpensive, easy-to-install solution for collating and storing prescription containers, including prescription vials and unit-of-use packages, dispensed from an automatic dispensing system.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
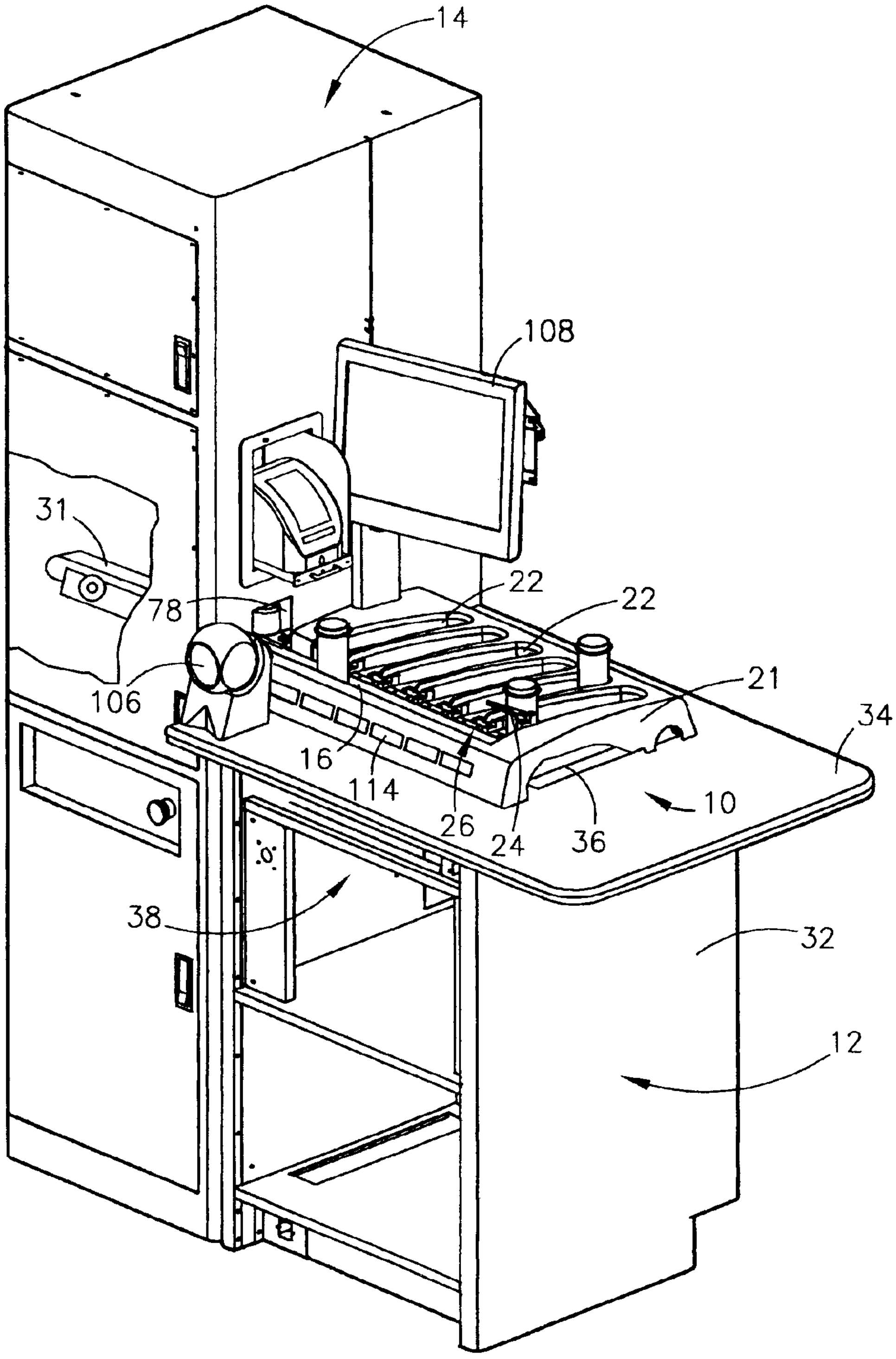
FIG. 1 is an isometric view of a collating unit constructed in accordance with a first preferred embodiment of the present invention and shown mounted on a control center cooperating with an automatic dispensing system ("ADS")

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 2:
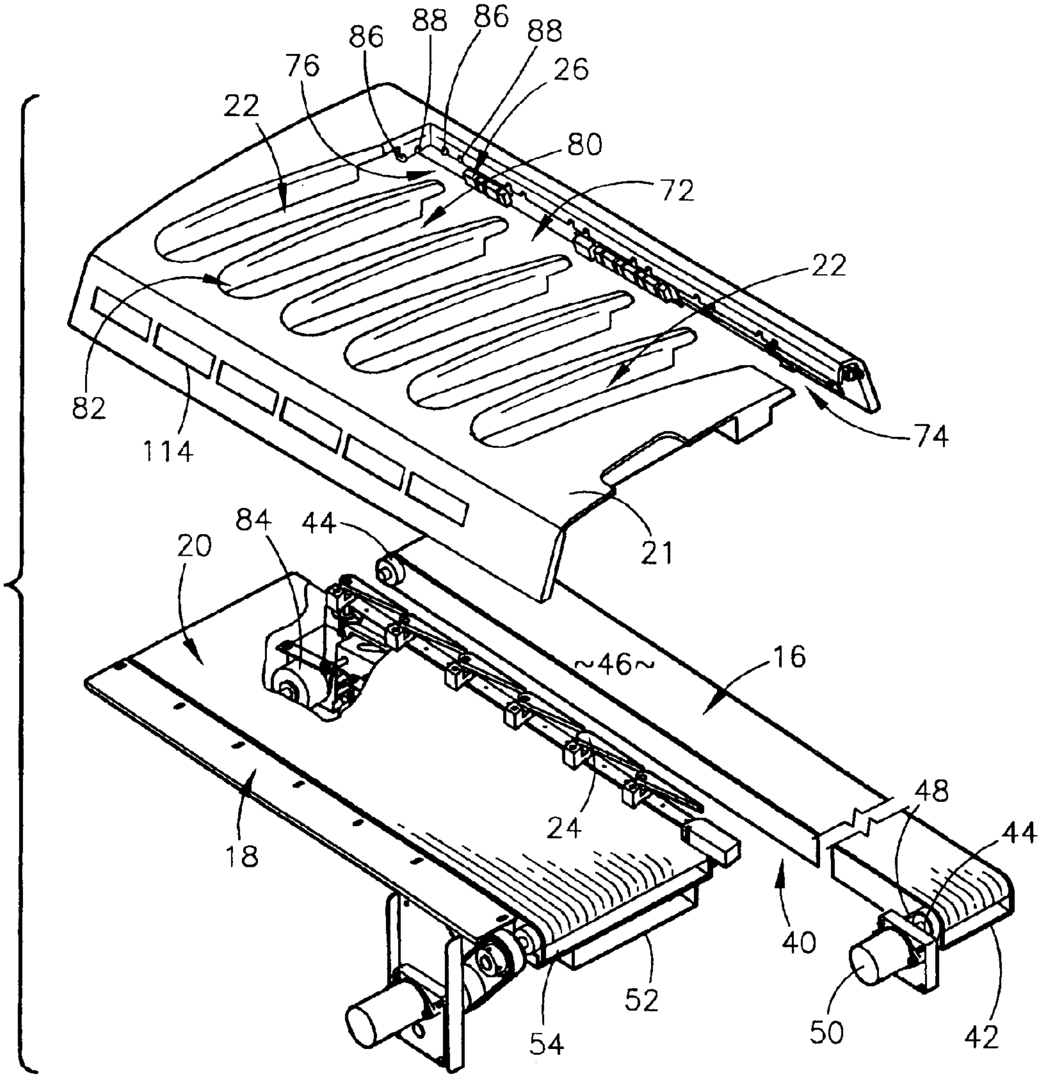
FIG. 2 is an exploded view of the collating unit, specifically illustrating an infeed conveyor, a collating unit conveyor, and a frame.
Figure 6:
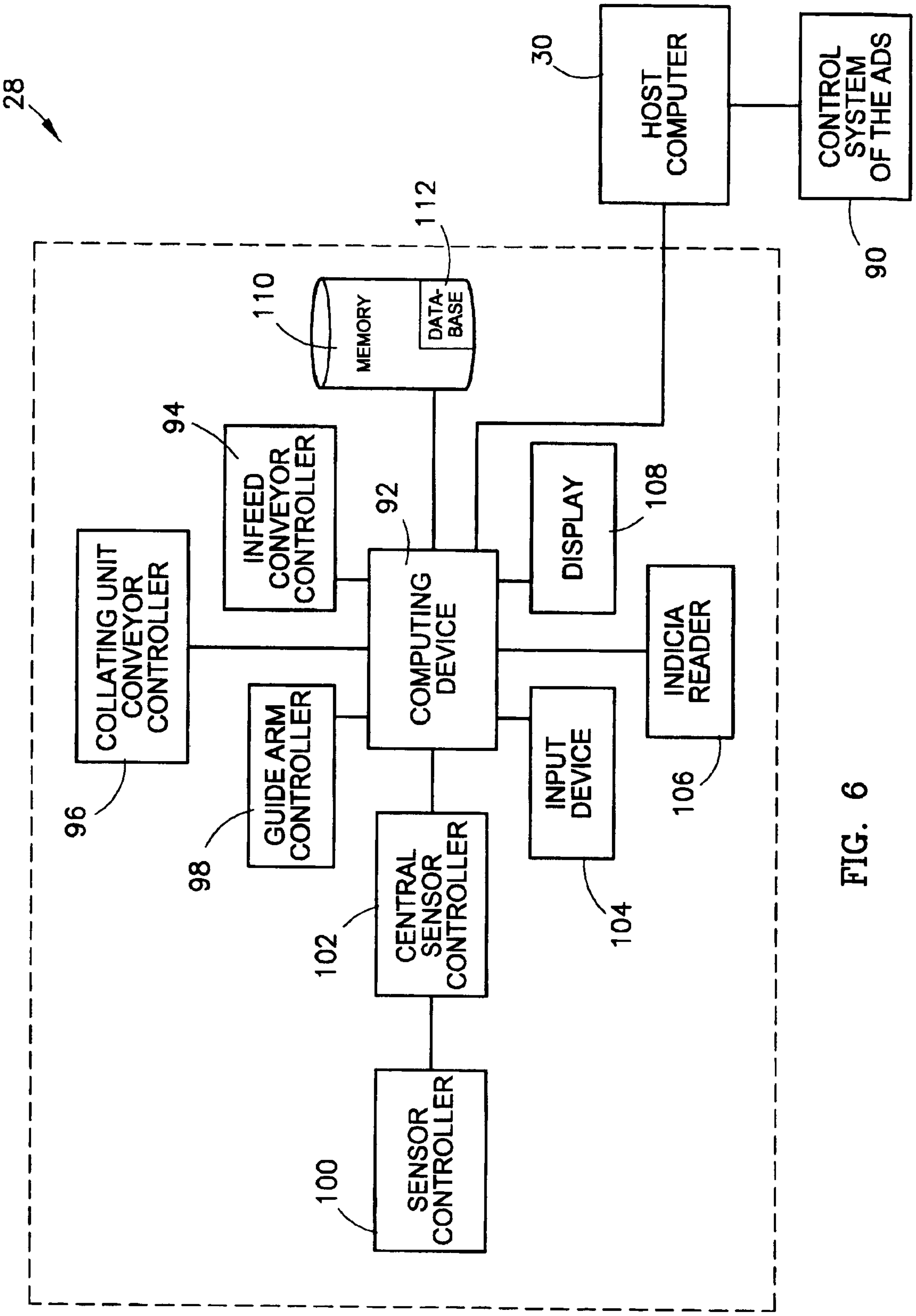
FIG. 6 is a schematic of the components of a control system of the collating unit.

Turning now to the drawing figures, and particularly FIGS. 1, 2, and 6 a collating unit 10 constructed in accordance with a first preferred embodiment of the invention is illustrated. The collating unit 10 is provided for use with a control center 12 cooperating with an automatic dispensing system ("ADS") 14. The collating unit 10 is operable to automatically store filled prescription containers, such as prescription vials and unit-of-use packages containing medicaments, exiting the ADS 14 based on an organization scheme that accounts for identifying information of the container, such as a patient name for whom the container is intended or a prescription number of the container.

The collating unit 10 broadly comprises an infeed conveyor 16 for transporting the prescription containers from the ADS 14 to the collating unit 10; a base 18 housed within the control center 12 and positioned generally adjacent to the infeed conveyor 16; a collating unit conveyor 20 mounted on the base 18; a frame 21 substantially surrounding and covering the infeed conveyor 16 and the base 18; a plurality of holding areas 22 formed within the frame 21; a plurality of guide arms 24 mounted on the base 18 between the infeed conveyor 16 and the collating unit conveyor 20 and operable to maneuver the containers from the infeed conveyor 16 into the plurality of holding areas 22; a plurality of sensors 26 to sense the presence of the containers within the collating unit 10; and a control system 28 for controlling operation of the infeed conveyor 16, the collating unit conveyor 20, the guide arms 24, and the sensors 26.

As noted above, the present invention cooperates with the ADS 14, such as, for example, the SP 200 Robotic Prescription Dispensing System or the SP Unit Dispenser, both manufactured and sold by ScriptPro LLC of Mission, Kans. Various aspects of ADSs are embodied in U.S. Pat. Nos. 5,337,919, 5,713,487, and 5,762,235, and U.S. patent application Ser. No. 09/457,286, all of which are hereby incorporated by reference. Briefly, the ADS 14 receives prescriptions ("scripts") via a host computer. The scripts are then automatically filled, either by automatically filling a prescription vial or automatically dispensing a unit-of-use package containing medicaments. The filled vials or packages, i.e. the containers, are transported, via an outfeed conveyor 31, to the control center 12, where an operator retrieves the containers from the outfeed conveyor 31, places caps on the containers that are prescription vials, and stores the containers in a predetermined storage unit or packages the containers for receipt directly by customers. The control center 12 is commonly a cabinet, table, or other housing structure 32 that houses caps for the vials, a printer, a scanner, a keyboard drawer, and other necessary supplies. A counter top 34 encloses a top of the cabinet 32 and provides a surface on which the outfeed conveyor 31 may be positioned. The control center 12 is thus a workstation from which a pharmacist, technician, or other operator may retrieve the containers from the outfeed conveyor 31 and manually store them in the predetermined storage unit.

The present invention may be positioned on the counter top 34 of the control center 12 and housed partially inside the cabinet 32 of the control center 12. To prepare the existing control center 12 for receipt of the collating unit 10 of the present invention, an opening 36 must be formed or cut in the counter top 34. The opening 36 allows access to a inside cavity 38 of the control center 12, where the printer, scanner, and other supplies are housed. Alternatively, a new counter top (not shown) for the control center 12 may be provided already having the opening 36 formed therein. Thus, the collating unit 10 of the present invention provides an automatic container storage unit that may be used with existing control centers 12. The collating unit 10 automatically stores containers exiting the ADS 14 by patient, prescription, or other predetermined storage scheme without input or handling by the operator.

The infeed conveyor 16 is preferably positioned on the counter top 34 of the control center 12 and extends from the ADS 14. In preferable form, the infeed conveyor 16 is also the outfeed conveyor 31 of the ADS 14, such that the outfeed conveyor 31 extends onto the counter top 34 of the control center 12. Alternatively, the infeed conveyor 16 may be positioned substantially adjacent to an end of the outfeed conveyor 31 of the ADS 14, such that containers being transported on the outfeed conveyor 31 continuously move onto the infeed conveyor 16 without interruption and without toppling or otherwise displacing the containers. Preferably, the infeed conveyor 16 extends a length of the collating unit 10 to transport containers to various locations in the collating unit 10.

As illustrated in FIG. 2, the infeed conveyor 16 includes a conveyor base 40 having a horizontal base section 42 preferably formed of metal. A pair of spaced-apart, transversely-extending rollers 44 are rotatably mounted to the conveyor base 40. A conveyor belt 46 is trained over the rollers 44 so that the belt 46 covers and rides over the horizontal base section 42. The rightmost roller 44, as viewed in FIG. 2, serves as a drive roller that is driven by a belt or chain 48 rotated by an infeed conveyor motor 50. The infeed conveyor motor 50 is in communication with the control system 28, as described in more detail below.

Figure 3:
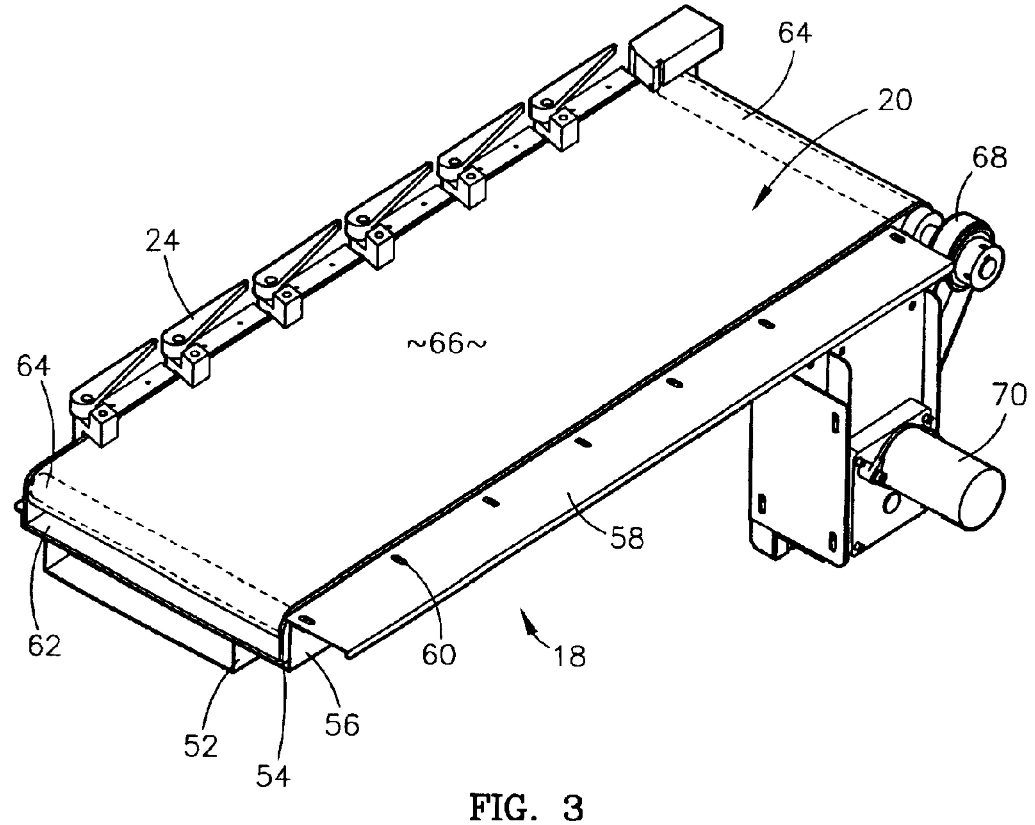
FIG. 3 is an isometric view of a base of the collating unit having the collating unit conveyor and a plurality of guide arms mounted thereon.

Turning to FIGS. 1, 2, and 3, the base 18 is positioned within the opening 36 in the counter top 34 and partially housed within the cavity 38 of the cabinet 32 of the control center 12. The base 18 is substantially rectangular in horizontal cross-section and extends the length of the collating unit 10, such that the base 18 is positioned generally adjacent to the infeed conveyor 16. The base 18 includes first and second supporting members 52,54 for supporting the collating unit 10, as illustrated in FIG. 3. The first supporting 52 member is preferably substantially rectangular in vertical cross-section and provides a support structure on which the second supporting member 54 is positioned. The second supporting member 54 is generally U-shaped in vertical cross-section. The shape of the second supporting member 54 forms a wide, hollow trough, the purpose of which will be described below. A leg 56 of the second supporting member 54 is provided with a securing plate 58 fitted at a general 90° angle to the leg 56. The securing plate 58 includes a plurality of holes 60 through which screws, bolts, or other securing fasteners may be guided to secure the base 18 to the counter top 34 of the control center 12. As such, the base 18 fits primarily within the cavity 38 of the control center 12, except for the securing plate 58, which lies flat against and is secured to the counter top 34. The base 18 is preferably formed of metal or other suitable material capable of providing a stable support structure for the collating unit 10.

The collating unit conveyor 20 is mounted within the hollow trough of the second supporting member 54 of the base 18, such that a top of the collating unit conveyor 20 is generally even with a top of the infeed conveyor 16. The collating unit conveyor 20 is generally similar to the infeed conveyor 16 in that the collating unit conveyor 20 includes a horizontal base section 62, a pair of spaced-apart, transversely-extending rollers 64 rotatably mounted to the horizontal base section 62, and a conveyor belt 66 trained over the rollers 64 so that the belt 66 covers and rides over the horizontal base section 62. The rightmost roller 64, as viewed in FIG. 3, serves as a drive roller that is driven by a belt 68 or chain rotated by a collating unit conveyor motor 70. The collating unit conveyor motor 70 is positioned within the cavity 38 of the control center 12 and is in communication with the control system 28, as described in more detail below.

Figure 4:
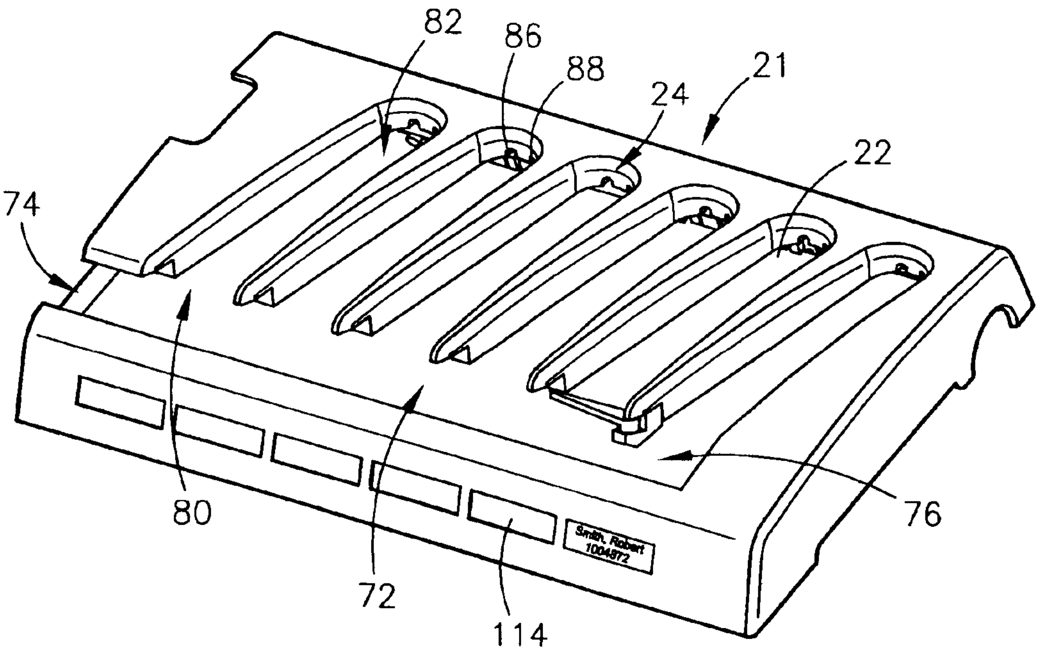
FIG. 4 is an isometric view of the frame of the collating unit, particularly illustrating a plurality of holding areas.
Figure 5:
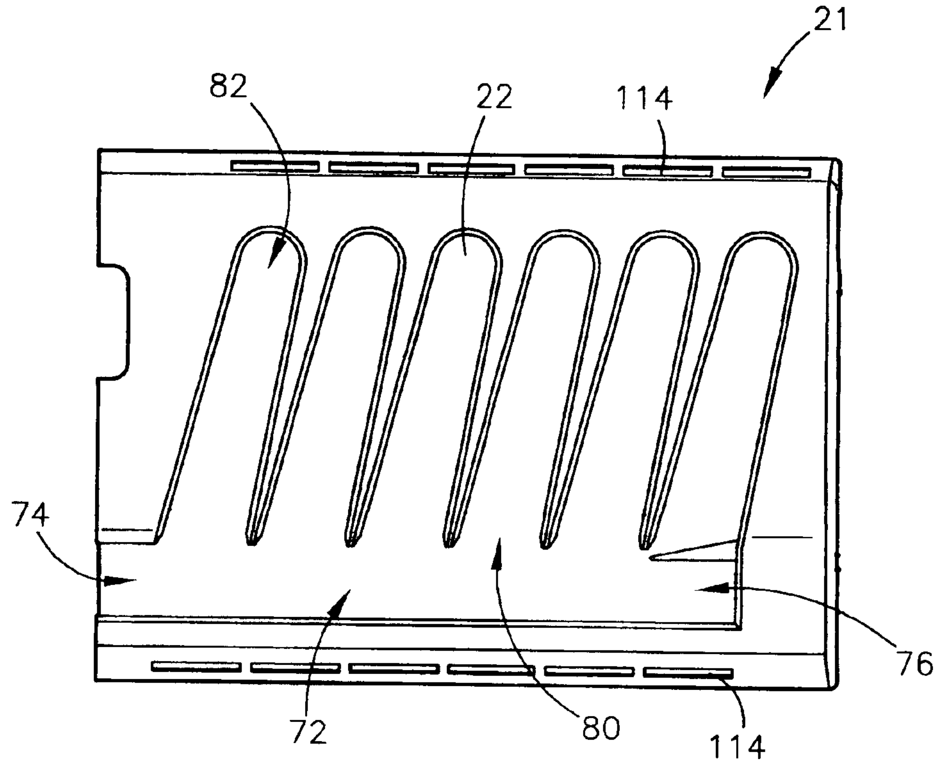
FIG. 5 is a plan view of the frame.

Turning now to FIGS. 4 and 5, the frame 21 preferably substantially surrounds the infeed conveyor 16 and the base 18 and collating unit conveyor 20 and abuts up against the ADS 14, as best illustrated in FIG. 1. The frame 21 may be secured to the infeed conveyor 16 and base 18 or may be sized to simply fit over the infeed conveyor 16 and base 18. The frame 21 includes a longitudinal slot 72 generally extending a length of the frame 21. When the frame 21 is positioned over the infeed conveyor 16 and base 18, the longitudinal slot 72 is substantially positioned over the infeed conveyor 16. The longitudinal slot 72 preferably includes an open end 74 and a closed end 76, and the open end 74 preferably abuts up against an opening in the ADS 14 through which the containers are transported, as illustrated in FIG. 1. Thus, as the containers are transported on the infeed conveyor 16, the containers are also guided within the longitudinal slot 72 of the frame 21. The frame 21 is preferably formed of plastic or other lightweight material, such as aluminum.

As with the longitudinal slot 72, the plurality of holding areas 22 are preferably formed in the frame 21. Each holding area 22 is generally U-shaped, and each area 22 is interconnected with the longitudinal slot 72, as best illustrated in FIGS. 4 and 5. Each area 22 preferably includes an open end 80 and a closed end 82, and the open end 80 of each area 22 is preferably positioned adjacent to the longitudinal slot 72. When the frame 21 is positioned over the infeed conveyor 16 and the base 18, the holding areas 22 are substantially positioned over the collating unit conveyor 20 mounted on the base 18, as illustrated in FIG. 2. In preferable form, the frame 21 includes six holding areas 22 generally arranged parallel to each other, although fewer or more areas 22 are possible depending on the size of the frame 21. Importantly, the holding areas 22 are preferably formed at an angle less than 90° to the longitudinal slot 72, as opposed to the holding areas 22 being formed substantially perpendicular to the longitudinal slot 72, the purpose of which will be described below. The holding areas 22 are also advantageously sized to accommodate both prescription vials and unit-of-use packages containing medicaments, such that the collating unit 10 may store both vials and packages simultaneously in the holding areas 22.

The plurality of guide arms 24 are rotatably mounted on the base 18 between the infeed conveyor 16 and the collating unit conveyor 20, as illustrated in FIG. 2. Each guide arm 24 is mounted at the open end 80 of each holding area 22, such that each guide arm 24 separates each holding area 22 from the longitudinal slot 72, as illustrated in FIGS. 1, 4, and 5. Thus, the collating unit 10 preferably has one guide arm 24 for each holding area 22 for a total of six guide arms 24.

The rotation of each guide arm 24 is driven by an individual guide arm motor 84, such that each guide arm 24 is operable to rotate outwardly into the longitudinal slot 72. Each guide arm motor 84 is in communication with the control system 28, as described in more detail below. As a container exits the ADS 14 and travels on the infeed conveyor 16 through the longitudinal slot 72, the control system 28 determines in which holding area 22 to store the container, as described in more detail below. The guide arm 24 for the selected holding area 22 opens via the guide arm motor 84, such that the container is guided within the holding area 22. As the guide arm 24 closes, the container is substantially moved within the holding area 22, as also described in more detail below.

The plurality of sensors 26 sense the presence or location of containers stored in the collating unit 10, as described in more detail below. Each sensor 26 preferably includes at least one infrared light emitting diode ("LED") 86 and at least one receiver 88, such that infrared energy emitted by the LED 86 is received by the receiver 88, as illustrated in FIG. 4. If an object, such as a container, is located in a path of the energy emitted from the LED 86, then the energy will reflect off of the object and be received by the receiver 88, thus indicating the presence of the object. In contrast, if no object is in the path of the emitted energy, then the energy has no object off of which to reflect or alternatively, the reflecting energy is measurably reduced. Therefore, little or no energy is received by the receiver 88, which indicates that no object is within the path of the energy emitted by the LED 86.

Sensors 26 are positioned at the closed end 76 of the longitudinal slot 72, at the closed end 82 of each holding area 22, and along the length of the longitudinal slot 72 proximate to the open end 80 of each holding area 22, as illustrated in FIGS. 2 and 4. Although infrared LEDs 86 and receivers 88 are described, the sensors 26 may include any conventional optical-type sensor having an optical emitter and an optical detector. The use and operation of the sensors 26 will be described in more detail below with respect to the operation of the collating unit 10.

Figure 7:
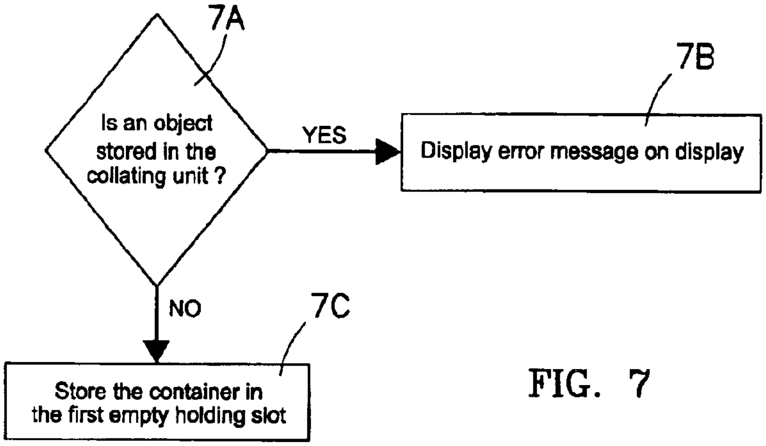
FIG. 7 is a flow diagram illustrating steps performed by the collating unit for storage of a prescription container.
Figure 8:
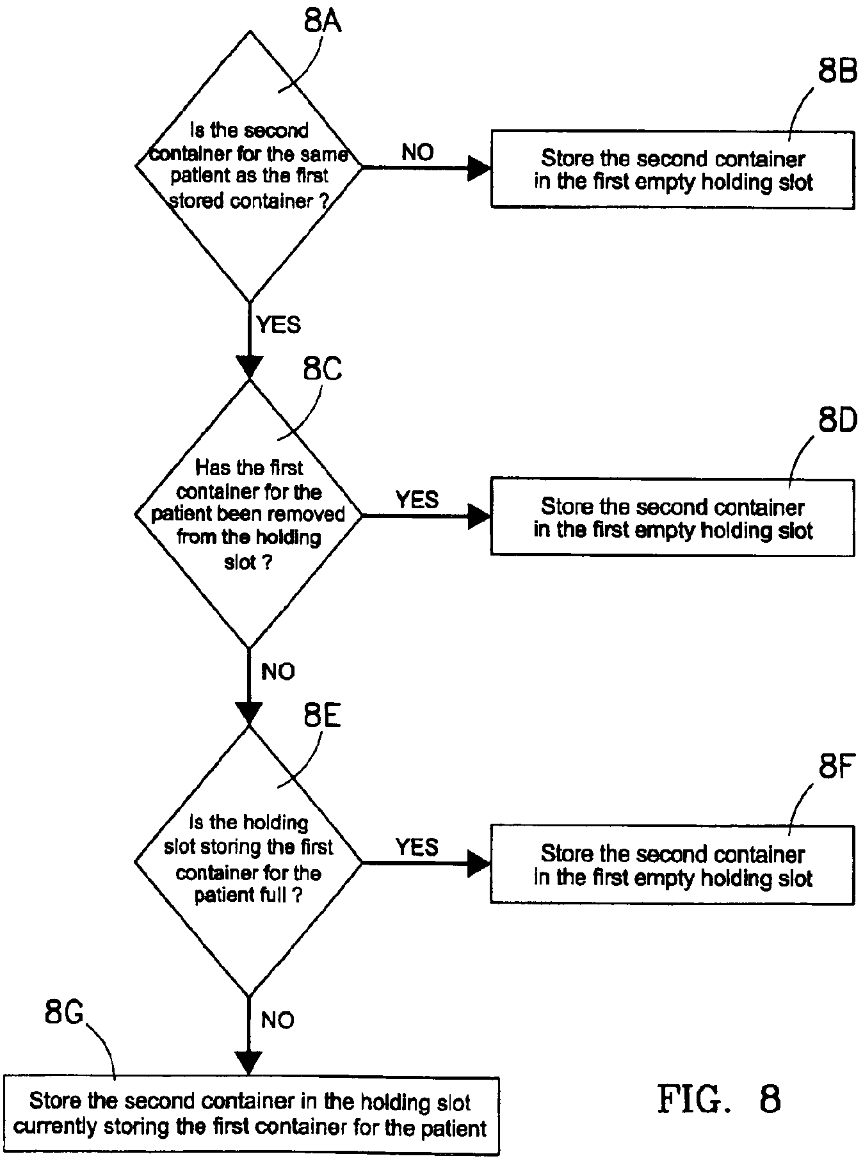
FIG. 8 is a flow diagram illustrating steps performed by the collating unit when storing multiple prescription containers for a patient.

Turning now to FIGS. 6, 7, and 8, the control system 28 of the present invention controls operation of the collating unit 10 and is integrated with a control system 90 of the ADS 14. The control system 90 of the ADS 14 receives data corresponding to prescriptions inputted to the host computer 30. The host computer 30 may be any pharmacy computer running a pharmacy automation program such as provided by Zadall Computer Systems. With respect to the collating unit 10 of the present invention, the control system 28 communicates with and controls operation of the infeed conveyor 16, the collating unit conveyor 20, the plurality of guide arms 24, and the plurality of sensors 26.

The control system 28 broadly includes a computing device 92, such as a computer, an infeed conveyor controller 94, a collating unit conveyor controller 96, a guide arm controller 98 for each guide arm 24, a sensor controller 100 for each sensor 26, a central sensor controller 102 for controlling operation of each of the individual sensor controllers 100, an input device 104, such as a keyboard, keypad, fingerprint reader, mouse, etc., an indicia reader 106, such as a bar code reader, and at least one display 108, such as a computer monitor, that serves as an operator interface.

The computing device 92 may broadly comprise any processor capable of being programmed and preferably also includes a memory 110 on which at least one database 112 may be stored. The computing device 92 communicates with and controls operation of the other components of the control system 28.

The infeed conveyor controller 94 controls operation of the infeed conveyor 16. Specifically, the infeed conveyor controller 94 is in communication with the infeed conveyor motor 50 and is operable to instruct movement of the motor 50. The infeed conveyor controller 94 receives instructions from the control system 28 on when to begin and end movement of the infeed conveyor 16.

The collating unit conveyor controller 96 controls operation of the collating unit conveyor 20. As with the infeed conveyor controller 94, the collating unit conveyor controller 96 communicates with the collating unit conveyor motor 70 and receives instructions from the control system 28 on when to begin and end movement of the collating unit conveyor 20.

Each guide arm controller 98 controls operation of its guide arm 24. Specifically, each guide arm controller 98 controls operation of its guide arm motor 84 and thus, is in communication with its guide arm motor 84. Each guide arm controller 98 receives instructions from the control system 28 on when to open and close its guide arm 24, as described in more detail below.

Each sensor controller 100 controls operation of its sensor 26, and, as noted above, the central sensor controller 102 controls operation of each sensor controller 102. Thus, the central sensor controller 102 is operable to transmit information to and receive information from each sensor controller 100. At predetermined intervals, the sensors 26 determine the presence of any stored containers within the collating unit 10, as described below, and information on any sensed containers is transmitted to the control system 28 via the central sensor controller 102.

Initially, a script is entered into the control system 90 of the ADS 14 by a pharmacist, technician, or other operator. When entering the script, the operator preferably also enters identifying information for the script, such as a patient's name. Additionally, the script is assigned a script number, wherein the script number identifies the particular patient name and medicament to be dispensed. Further, a unique bar code is associated with the script, and the bar code is preferably placed on any paperwork for the script, the purpose of which will be described below.

Once the script is entered into the control system 28, the ADS 14 automatically dispenses a first initial container, wherein the container is either a prepackaged unit-of-use prescription package or a vial filled with the prescribed medicament. The ADS 14 then labels the container with the identifying information and bar code for the script and conveys the container to the collating unit 10 via the outfeed conveyor 31, as described above. The control system 90 of the ADS 14 sends the script information to the control system 28 of the collating unit 10, including the patient's name and the script number.

Before storing the first container in the collating unit 10, the sensors 26 of the collating unit 10 determine if any object is stored or otherwise located in the collating unit 10, as depicted in Box 7A of FIG. 7. Thus, the sensor 26 positioned at the closed end 76 of the longitudinal slot 72 determines if any object is located on the infeed conveyor 16, and the sensors 26 positioned at the closed and open ends 80,82 of each holding area 22 determine if any object is located in any of the holding areas 22. If the sensors 26 determine that an object is located in the collating unit 10, such information is transmitted to the control system 28 via the central sensor controller 102, and the control system 28 instructs an error message to be displayed on the display 108, as depicted in Box 7B. If the sensors 26 determine that no object is located in the collating unit 10, the control system 28 instructs the first container exiting the ADS 14 to be stored in the collating unit 10, as depicted in Box 7C. Thus, the sensors 26 can determine if a prescription container from a previous use has not been removed from the collating unit 10 or if a foreign object has been placed in the collating unit 10.

When the collating unit 10 is initially empty, the control system 28 instructs the first container exiting the ADS 14 be stored in the first available holding area 22, i.e. the holding area 22 nearest to the ADS 14. To store the container in the holding area 22, the control system 28 instructs the infeed conveyor 16 to move forward, and the guide arm 24 for the selected holding area 22 to open. Once the guide arm 24 opens into the longitudinal slot 72 and into the path of the container, the container is prevented from being transported by the infeed conveyor 16 and is held in place in the longitudinal slot 72 by the guide arm 24. The sensor 26 positioned at the open end 80 of the holding area 22 is then instructed to confirm that the container is located at the open end 80 of the holding area 22. If the sensor 26 at the open end 80 does confirm the presence of the container, the control system 28 instructs the guide arm 24 for the area 22 to close, which consequently moves the container off of the infeed conveyor 16 and into the holding area 22 and onto the collating unit conveyor 20. Once the guide arm 24 closes, the control system 28 instructs the collating unit conveyor 20 to move forward. Since the holding area 22 is formed at an angle within the frame 21, as discussed above, forward movement of the collating unit conveyor 20 moves the container proximate to the closed end 82 of the holding area 22. This allows room for other containers to be stored in the area 22 without disrupting or otherwise toppling the currently stored container.

As containers are stored in the collating unit 10, the control system 28 of the collating unit 10 stores such information in the memory 110. An operator of the collating unit 10 may at any time determine which containers are currently stored in the collating unit 10 and the location of the containers in the collating unit 10. Further, the control system 28 stores the identifying information for each stored container in the memory 110.

After the control system 28 instructs the first container to be stored in the holding area 22, the control system 28 instructs an indicator 114 proximate to the area 22 to display the identifying information for the container, such as the patient name and script number, as illustrated in FIG. 4. The indicator is preferably a vacuum fluorescent display and multiple indicators 114 are preferably secured to opposing sides of the frame 21. The indicator 114 for each holding area 22 is preferably lit once a container is stored in the holding area 22.

To store a second container in the collating unit 10, the control system 28 first determines if the second container is for the same patient as the first container, as depicted in Box 8A of FIG. 8. If the second container is not for the same patient as the first container, the control system 28 will not store the second container in the same holding area 22 in which the first container was stored, since the control system 28 will not store containers for different patients in the same holding area 22. Thus, the control system 28 instructs the second container to be stored in the first empty holding area 22, as depicted in Box 8B.

If the second container is for the same patient as the first container, the control system 28 determines if the first container for the patient has been retrieved or otherwise removed from the holding area 22, as depicted in Box 8C. The control system 28 determines if the first container has been removed from the holding area 22 by instructing the sensors 26 for the holding area 22 to determine if an object is located in the area 22. Such information is transmitted to the control system 28 via the sensor controller 100 for the holding area 22 and the central sensor controller 102. If the holding area 22 is empty, and thus, the first container has been removed, the control system 28 instructs the second container to be stored in the first empty holding area 22, as depicted in Box 8D.

If the first container for the patient has not been removed from the holding area 22, the control system 28 determines if the holding area 22 storing the first container is full, as depicted in Box 8E. In this example, since only one container has been stored in the collating unit 10, namely the first container, the holding area 22 that is holding the first stored container will not be full. However, in operation, several containers may be stored in the collating unit 10, and thus, it is possible the holding area 22 may be full. To determine if the holding area 22 is full, the sensor 26 positioned proximate to the open end 80 of the holding area 22 along the longitudinal slot 72 determines if any container is located proximate to the open end 80 of the holding area 22 and thus, if the holding area 22 is full. Since any previously stored container will be transported along the length of the holding area 22 due to the movement of the collating unit conveyor 20, as discussed above, then if the sensor 26 positioned proximate to the open end 80 of the holding area 22 senses any container, the control system 28 knows the holding area 22 is full.

If the holding area 22 already storing containers for the patient is full, the control system 28 instructs the second container for the patient to be placed in the first empty holding area 22, as depicted in Box 8F. If the holding area 22 is not full, the control system 28 instructs the second container for the patient to be placed in the holding area 22 currently storing the first container for the patient, as depicted in Box 8G.

The above process is repeated for each container exiting the ADS 14. As noted above, as containers are stored in the collating unit 10, the control system 28 tracks in which holding area 22 the container is stored and the patient for whom the container is intended. The control system 28 displays such information on the display 108 so that an operator of the collating unit 10 can quickly and easily determine the location of any container. When the operator desires to retrieve a container for a patient, the operator may locate the correct holding area 22 storing the prescription containers for the patient by any one of the following methods:

(1) find the correct holding area 22 storing the container for the patient from the information displayed on the indicator 114 associated with the holding area 22;

(2) highlight the script on a display (not shown) of the ADS 14 using either an input device (not shown) or an indicia reader (not shown) of the ADS' control system 90; or (3) highlight the script on the display 108 of the collating unit's control system 28 using either the input device 104 or the indicia reader 106.

Locating the holding area 22 by reading each indicator 114 may be time-consuming and error-prone. Therefore, the present invention allows the operator to highlight the locating information either using the input device 104 or the indicia reader 106 and either on the ADS' display (now shown) or the collating unit's display 108. The display 108 is preferably a flat-screen computer monitor mounted on an outer face of the ADS 14, as illustrated in FIG. 1. The method of the second and third options above are substantially similar, and therefore, only the third option will be described below.

To retrieve a container using a patient's name, for example, the operator may input the patient's name into the control system 28 by either typing the name using the keyboard, highlighting the name on the display 108 using the mouse, touching the name on the display 108 if the control system 28 includes touch-screen software, or any other suitable method. Preferably, the indicator 114 for the holding area 22 will flash, indicating the holding area 22 contains the identified container for the script. Alternatively, the operator may scan the bar code for the paperwork for the script using the indicia reader 106, which also triggers flashing of the indicator 114.

Upon retrieval or removal of the container from the holding area 22, the control system 28 closes the script to indicate the container for the patient has been retrieved. If the patient has more than one container, the control system 28 does not close the script until all containers for the patient have been retrieved from the collating unit 10. As a security feature, after retrieval of the containers from the holding area 22, the sensors 26 associated with the holding area 22, i.e. the sensors 26 positioned at the open and closed ends 80,82 of the holding area 22, determine if any container is located in the area 22. If a container is located in the holding area 22, the control system 28 instructs an error message to be displayed on the display 108. This alerts a busy operator that not all containers for the patient were retrieved. Upon removal of all containers from the holding area 22, the control system 28 registers the holding area 22 as empty and operable to store additional containers.

Figure 9:
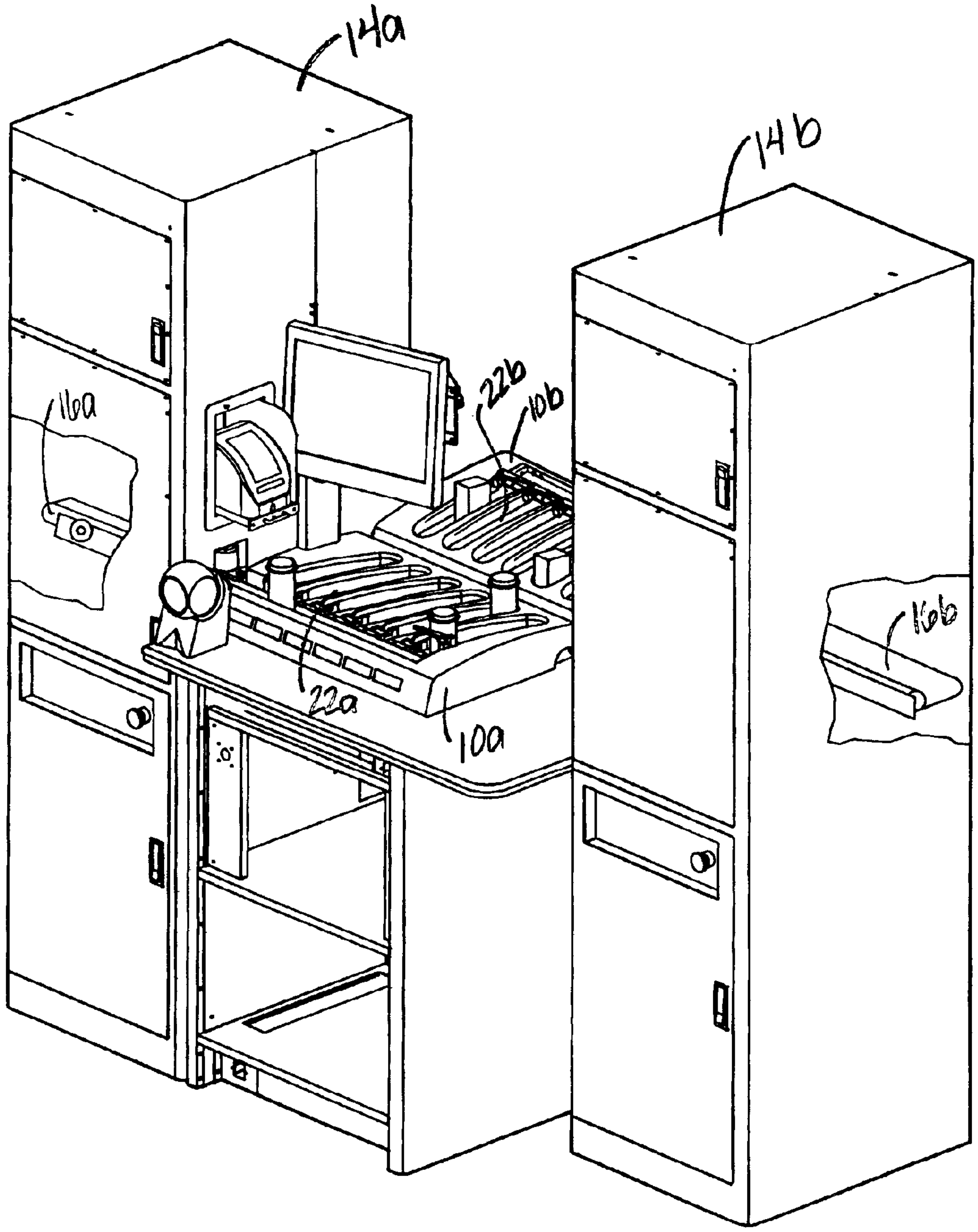
FIG. 9 is an isometric view of two collating units constructed in accordance with a second preferred embodiment of the present invention, wherein prescription containers are routed on two infeed conveyors to the two collating units.

In a second preferred embodiment, an ADS 14*a* is operable to dispense both prescription vials and unit-of-use packages to multiple collating units, hereinafter referred to as first and second collating units 10*a*, 10*b*, via multiple infeed conveyors, hereinafter referred to as first and second infeed conveyors 16*a*, 16*b*, as illustrated in FIG. 9. The collating units 10*a*, 10*b* of the second preferred embodiment are substantially similar to the collating unit 10 of the first preferred embodiment. Similarly, the infeed conveyors 16*a*, 16*b* of the second preferred embodiment are substantially similar to the infeed conveyor 16 of the first preferred embodiment.

As illustrated in FIG. 9, the first infeed conveyor 16*a* may be operable to transport prescription vials to the first collating unit 10*a*, and the second infeed conveyor 16*b* may be operable to transport prescription unit-of-use packages to the second collating unit 10*b*. The first and second collating units 10*a*, 10*b* may be positioned such that the holding areas 22*a*,22*b*, substantially similar to the holding area 22 of the first preferred embodiment, are generally head-to-head, although other arrangements are possible. Thus, the prescription vials for the patient may be routed to the holding area 22*a* within the first collating unit 10*a*, and the prescription packages for the patient may be routed to the holding area 22*b* within the second collating unit 10*b*, wherein the holding areas 22*a*,22*b* are adjacent or generally proximate to each other. The prescription containers for the patient are then generally grouped together for easy retrieval by the operator. More than two collating units 10*a*, 10*b* may be required for a busy pharmacy.

Alternatively, the first and second infeed conveyors 16*a*, 16*b* may transport the prescription containers and packages to one collating unit 10 (not shown in FIG. 9) substantially similar to the collating unit 10 of the first preferred embodiment, and the prescription vials and packages for each patient may be routed to the same holding area 22.

The second preferred embodiment may be used with the ADS 14*a*, which is operable to dispense both prescription vials and prescription unit-of-use packages, as illustrated in FIG. 9. The ADS 14*a* preferably includes two separate dispensing machines with the collating units 10*a*, 10*b* positioned therebetween. For example, the leftmost dispensing machine is operable to dispense prescription vials via the first infeed conveyor 16*a* to the first collating unit 10*a*, and the rightmost dispensing machine is operable to dispense prescription packages via the second infeed conveyor 16*b* to the second collating unit 10*b*. Alternatively, the ADS 14*a* could be one single dispensing machine operable to dispense both prescription vials and packages and thus include multiple infeed conveyors 16*a*, 16*b* mounted within the dispensing machine (not shown in FIG. 9) and operable to feed to at least one collating unit 10.

Although the invention has been described with reference to the preferred embodiment illustrated in the attached drawing figures, it is noted that equivalents may be employed and substitutions made herein without departing from the scope of the invention as recited in the claims. For example, a prescription container dimension sensor may be used with the collating unit 10 as a security feature to ensure that the container being stored in the collating unit 10 is the same container the control system 90 of the ADS 14 is expecting to be stored in the collating unit 10. This prevents foreign objects placed in the collating unit 10 during the storing process mistakenly being recognized as a container exiting the ADS 14. The container dimension sensor may be operable to recognize that the dimensions of the container to be stored do not match the expected dimensions provided by the control system 90 of the ADS 14. Additionally, the collating unit 10 may include holding areas 22 of varying dimensions for holding containers of varying dimensions.

Further, prior art control centers may be manufactured with the collating unit 10, as opposed to the above-described incorporation of the collating unit 10 with the existing control center 12. Additionally, sensors 26 may be positioned on each guide arm 24 to further sense if a container is contacting the guide arm 24.

Having thus described the preferred embodiment of the invention, what is claimed as new and desired to be protected by Letters Patent includes the following:

1. A collating unit for automatically storing prescription containers dispensed by an automatic dispensing system, the collating unit comprising:

a storage unit for storing the containers delivered by an infeed conveyor;

a plurality of holding areas formed within the storage unit for holding the containers;

a plurality of guide arms mounted within the storage unit and operable to maneuver the containers from the infeed conveyor into the plurality of holding areas; and a control system for controlling operation of the infeed conveyor and the plurality of guide arms.

2. The collating unit as claimed in claim 1, the storage unit including— a base positioned generally adjacent to the infeed conveyor;

a collating unit conveyor mounted on the base; and a frame substantially surrounding and covering the infeed conveyor and the collating unit conveyor.

3. The collating unit as claimed in claim 2, wherein the infeed conveyor is an outfeed conveyor of the automatic dispensing system.

4. The collating unit as claimed in claim 3, wherein the frame includes a longitudinal slot extending a length of the collating unit and formed within the frame such that when the frame is positioned over the infeed and collating unit conveyors, the longitudinal slot is generally positioned over the infeed conveyor.

5. The collating unit as claimed in claim 4, wherein the holding areas are formed within the frame of the storage unit, such that when the frame is positioned over the infeed and collating unit conveyors, the holding areas formed within the frame are generally positioned over the collating unit conveyor.

6. The collating unit as claimed in claim 5, wherein each holding area includes an open end and a closed end, and the open end of each area is interconnected with the longitudinal slot, such that each holding area is formed in the frame at an angle less than 90° with respect to the longitudinal slot.

7. The collating unit as claimed in claim 1, further including a plurality of sensors mounted in the storage unit for sensing the presence of containers stored in the collating unit.

8. A collating unit for automatically storing prescription containers dispensed by an automatic dispensing system, the collating unit comprising:

an infeed conveyor for transporting the containers from the automatic dispensing system to the collating unit;

a collating unit conveyor positioned generally adjacent to the infeed conveyor;

a frame substantially surrounding and covering the infeed conveyor and the collating unit conveyor;

a plurality of holding areas formed within the frame for holding the containers;

a plurality of guide arms mounted between the infeed conveyor and the collating unit conveyor and operable to maneuver the containers from the infeed conveyor into the plurality of holding areas; and a control system for controlling operation of the infeed conveyor, the collating unit conveyor, and the plurality of guide arms.

9. The collating unit as claimed in claim 8, further including— a base positioned generally adjacent to the infeed conveyor, wherein the collating unit conveyor is mounted on the base, and a plurality of sensors mounted on the frame and operable to sense the presence of stored containers.

10. The collating unit as claimed in claim 9, wherein the frame includes a longitudinal slot extending a length of the collating unit and formed within the frame such that when the frame is positioned over the infeed and collating unit conveyors, the longitudinal slot is generally positioned over the infeed conveyor.

11. The collating unit as claimed in claim 10, wherein when the frame is positioned over the infeed and collating unit conveyors, the holding areas formed within the frame are generally positioned over the collating unit conveyor.

12. The collating unit as claimed in claim 11, wherein each holding area includes an open end and a closed end, and the open end of each area is interconnected with the longitudinal slot, such that each holding area is formed in the frame at an angle less than 90° with respect to the longitudinal slot.

13. A collating unit for automatically storing prescription containers dispensed by an automatic dispensing system, the collating unit comprising:

an infeed conveyor for transporting the containers from the automatic dispensing system to the collating unit;

a base positioned generally adjacent to the infeed conveyor;

a collating unit conveyor mounted on the base;

a frame substantially surrounding and covering the infeed conveyor and the collating unit conveyor;

a plurality of holding areas formed within the frame for holding the containers;

a plurality of guide arms mounted on the base between the infeed conveyor and the collating unit conveyor and operable to maneuver the containers from the infeed conveyor into the plurality of holding areas;

a plurality of sensors positioned on the frame and operable to sense the presence of the containers stored in the collating unit; and a control system for controlling operation of the infeed conveyor, the collating unit conveyor, the plurality of guide arms, and the plurality of sensors.

14. The collating unit as claimed in claim 13, wherein the collating unit is configured for use with an existing control center cooperating with the automatic dispensing system.

15. The collating unit as claimed in claim 14, wherein the infeed conveyor is an outfeed conveyor of the automatic dispensing system.

16. The collating unit as claimed in claim. 15, wherein the base is positioned in an opening in a counter top of the control center.

17. The collating unit as claimed in claim 16, wherein the frame includes a longitudinal slot extending a length of the collating unit and formed within the frame such that when the frame is positioned over the infeed and collating unit conveyors, the longitudinal slot is generally positioned over the infeed conveyor.

18. The collating unit as claimed in claim 17, wherein when the frame is positioned over the infeed and collating unit conveyors, the holding areas formed within the frame are generally positioned over the collating unit conveyor.

19. The collating unit as claimed in claim 18, wherein each holding area includes an open end and a closed end, and the open end of each area is interconnected with the longitudinal slot, such that each holding area is formed in the frame at an angle less than 90° with respect to the longitudinal slot.

20. The collating unit as claimed in claim 19, wherein sensors are positioned at an end of the longitudinal slot, at the closed end of each holding area, and at the open end of each holding area along a length of the longitudinal slot.

21. The collating unit as claimed in claim 20, the control system including— a computing device from which the control system may be operated, an infeed conveyor controller for controlling operation of the infeed conveyor, a collating unit conveyor for controlling operation of the collating unit conveyor, a guide arm controller for controlling operation of each guide arm, a sensor controller for controlling operation of each sensor, a central sensor controller for controlling operation of each sensor controller, an input device for inputting identifying information for the containers, such as a patient's name or a script number for each container, into the control system, an indicia reader for reading a bar code associated with the container, and at least one display that serves as an operator interface.

* * * * *

US006910601C1

(12) INTER PARTES REEXAMINATION CERTIFICATE (0223rd)
United States Patent
Thomas et al.

(10) Number: US 6,910,601 C1
(45) Certificate Issued: Jan. 4, 2011

(54) COLLATING UNIT FOR USE WITH A CONTROL CENTER COOPERATING WITH AN AUTOMATIC PRESCRIPTION OR PHARMACEUTICAL DISPENSING SYSTEM

(75) Inventors: Tracy I. Thomas, Overland Park, KS (US); Michael E. Coughlin, Mission Hills, KS (US)

(73) Assignee: Scriptpro LLC, Mission, KS (US)

Reexamination Request:
No. 95/000,292, Sep. 4, 2007

Reexamination Certificate for:
Patent No.: 6,910,601
Issued: Jun. 28, 2005
Appl. No.: 10/615,503
Filed: Jul. 8, 2003

Related U.S. Application Data

(60) Provisional application No. 60/394,589, filed on Jul. 8, 2002.

(51) Int. Cl.
*B65H 1/00* (2006.01)
*B65G 59/00* (2006.01)

(52) U.S. Cl. ....................................... 221/119; 700/244

(58) Field of Classification Search ........................ None
See application file for complete search history.

(56) References Cited

U.S. PATENT DOCUMENTS

| | | | |
|---|---|---|---|
| 3,642,117 | A | 2/1972 | Burt |
| 3,955,678 | A | 5/1976 | Moyer |
| 4,711,357 | A | 12/1987 | Langenbeck |
| 5,208,762 | A | 5/1993 | Charhut et al. |
| 5,620,102 | A | 4/1997 | Finch, Jr. |
| 5,749,473 | A | 5/1998 | Yamashita et al. |
| 5,771,657 | A | 6/1998 | Lasher et al. |
| 5,963,453 | A | 10/1999 | East |

FOREIGN PATENT DOCUMENTS

WO WO 98/09598 3/1998

OTHER PUBLICATIONS

Case History (as of Jan. 9, 2008) for 2:06–cv–02468–CM–JPO *ScriptPro LLC* v *Innovation Associates, Inc* in the U.S. District Court, District of Kansas.

2:06–cv–02468–CM–JPO *ScriptPro LLC* v *Innovation Associates, Inc.;* Document 1—Complaint.

2:06–cv–02468–CM–JPO *ScriptPro LLC* v *Innovation Associates, Inc.;* Document 1–2—Exhibit; U.S. Patent 6,910,601.

2:06–cv–02468–CM–JPO *ScriptPro LLC* v *Innovation Associates, Inc.;* Document 2—Designation of Place of Trial.

2:06–cv–02468–CM–JPO *ScriptPro LLC* v *Innovation Associates, Inc.;* Document 3—AO Form 120.

2:06–cv–02468–CM–JPO *ScriptPro LLC* v *Innovation Associates, Inc.;* Document 3–2—Exhibit; U.S. Patent 6,910,601.

(Continued)

*Primary Examiner*—Beverly M. Flanagan

(57) ABSTRACT

A collating unit (10) for use with a control center (12) cooperating with an automatic dispensing system ("ADS") (14) for automatic storage of prescription containers dispensed from the ADS (14). The collating unit (10) broadly comprises an infeed convey or (16) for transporting the prescription containers from the ADS (14) to the collating unit (10); a base (18) housed within the control center (12) and positioned generally adjacent to the infeed conveyor (16); a collating unit conveyor (20) mounted on the base (18); a frame (21) substantially surrounding and covering the infeed conveyor (16) and the base (18); a plurality of holding areas (22) formed within the frame (21); a plurality of guide arms (24) mounted on the base (18) between the infeed conveyor (16) and the collating unit conveyor (20) and operable to maneuver the containers from the infeed conveyor (16) into the plurality of holding areas (22); a plurality of sensors (26) to sense the presence of the containers within the collating unit (10); and a control system (28) for controlling operation of the infeed conveyor (16), the collating unit conveyor (20), the guide arms (24), and the sensors (26).

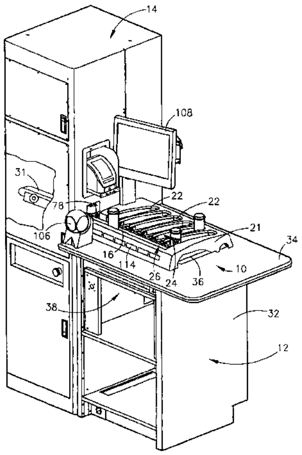

OTHER PUBLICATIONS

2:06–cv–02468–CM–JPO *ScriptPro LLC* v *Innovation Associates, Inc.;* Document 4—Corporate Disclosure Statement.

2:06–cv–02468–CM–JPO *ScriptPro LLC* v *Innovation Associates, Inc.;* Document 5—Entry of Appearance.

2:06–cv–02468–CM–JPO *ScriptPro LLC* v *Innovation Associates, Inc.;* Document 6—Return of Service of Summons Executed.

2:06–cv–02468–CM–JPO *ScriptPro LLC* v *Innovation Associates, Inc.;* Document 7—Answer to Complaint.

2:06–cv–02468–CM–JPO *ScriptPro LLC* v *Innovation Associates, Inc.;* Document 8—Designation of Place of Trial.

2:06–cv–02468–CM–JPO *ScriptPro LLC* v *Innovation Associates, Inc.;* Document 9—Corporate Disclosure Statement.

2:06–cv–02468–CM–JPO *ScriptPro LLC* v *Innovation Associates, Inc.;* Document 10—Order Setting Scheduling Conference.

2:06–cv–02468–CM–JPO *ScriptPro LLC* v *Innovation Associates, Inc.;* Document 11—Motion to Appear Pro Hac Vice Levy.

2:06–cv–02468–CM–JPO *ScriptPro LLC* v *Innovation Associates, Inc.;* Document 11–2—Affidavit in Support Levy.

2:06–cv–02468–CM–JPO *ScriptPro LLC* v *Innovation Associates, Inc.;* Docket Text for Document 12—Order on Motion to Appear Pro Hac Vice Levy.

2:06–cv–02468–CM–JPO *ScriptPro LLC* v *Innovation Associates, Inc.;* Document 13—Answer to Counterclaim.

2:06–cv–02468–CM–JPO *ScriptPro LLC* v *Innovation Associates, Inc.;* Document 14—Motion to Continue.

2:06–cv–02468–CM–JPO *ScriptPro LLC* v *Innovation Associates, Inc.;* Document 15—Order on Motion to Continue.

2:06–cv–02468–CM–JPO *ScriptPro LLC* v *Innovation Associates, Inc.;* Document 16—Motion to Appear Pro Hac Vice Shields.

2:06–cv–02468–CM–JPO *ScriptPro LLC* v *Innovation Associates, Inc.;* Document 16–2—Affidavit in Shields.

2:06–cv–02468–CM–JPO *ScriptPro LLC* v *Innovation Associates, Inc.;* Document 17—Motion to Appear Pro Hac Vice Wilkins.

2:06–cv–02468–CM–JPO *ScriptPro LLC* v *Innovation Associates, Inc.;* Document 17–2—Affidavit in Support Wilkins.

2:06–cv–02468–CM–JPO *ScriptPro LLC* v *Innovation Associates, Inc.;* Document 18—Affidavit in Support of Pro Hac Vice Motion Shields.

2:06–cv–02468–CM–JPO *ScriptPro LLC* v *Innovation Associates, Inc.;* Docket Text for Document 19—Order on Motion to Appear Pro Hac Vice Shields and Wilkins.

2:06–cv–02468–CM–JPO *ScriptPro LLC* v *Innovation Associates, Inc.;* Document 20—Protective Order.

2:06–cv–02468–CM–JPO *ScriptPro LLC* v *Innovation Associates, Inc.;* Document 21—Scheduling Order.

2:06–cv–02468–CM–JPO *ScriptPro LLC* v *Innovation Associates, Inc.;* Document 22—Certificate of Service.

2:06–cv–02468–CM–JPO *ScriptPro LLC* v *Innovation Associates, Inc.;* Document 23—Motion for Leave.

2:06–cv–02468–CM–JPO *ScriptPro LLC* v *Innovation Associates, Inc.;* Document 23–2—Amended Answer and Counterclaims.

2:06–cv–02468–CM–JPO *ScriptPro LLC* v *Innovation Associates, Inc.;* Docket Text for Document 24—Order on Motion for Leave to File.

2:06–cv–02468–CM–JPO *ScriptPro LLC* v *Innovation Associates, Inc.;* Document 25—Answer to Complaint.

2:06–cv–02468–CM–JPO *ScriptPro LLC* v *Innovation Associates, Inc.;* Document 26—Certificate of Service.

2:06–cv–02468–CM–JPO *ScriptPro LLC* v *Innovation Associates, Inc.;* Document 27—Answer to Counterclaim.

2:06–cv–02468–CM–JPO *ScriptPro LLC* v *Innovation Associates, Inc.;* Document 28—Motion to Stay Case.

2:06–cv–02468–CM–JPO *ScriptPro LLC* v *Innovation Associates, Inc.;* Document 29—Memorandum in Support of Motion.

2:06–cv–02468–CM–JPO *ScriptPro LLC* v *Innovation Associates, Inc.;* Document 30—Certificate of Service.

2:06–cv–02468–CM–JPO *ScriptPro LLC* v *Innovation Associates, Inc.;* Docket Text for Document 31—Order.

2:06–cv–02468–CM–JPO *ScriptPro LLC* v *Innovation Associates, Inc.;* Document 32—Repsonse to Motion.

2:06–cv–02468–CM–JPO *ScriptPro LLC* v *Innovation Associates, Inc.;* Document 33—Order on Motion to Stay Case.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8, 9 and 13-16 is confirmed.

Claims 1, 2 and 4 are determined to be patentable as amended.

Claim 7, dependent on an amended claim, is determined to be patentable.

Claims 5, 6, 10-12 and 17-21 were not reexamined.

1. A collating unit [for automatically storing] *configured to automatically store therein* prescription containers dispensed by an automatic dispensing system, the collating unit comprising:

a storage unit [for storing the] *configured to store in an upright configuration a plurality of prescription* containers delivered by an infeed conveyor;

a plurality of holding areas formed within the storage unit for holding the *plurality of prescription* containers *in an upright configuration*;

a plurality of guide arms mounted within the storage unit and operable to maneuver the *plurality of prescription* containers from the infeed conveyor into the plurality of holding areas, and a control system for controlling operation of the infeed conveyor and the plurality of guide arms;

*wherein the storage unit includes a frame raised above and substantially surrounding at least a portion of at least one of the infeed conveyor or another conveyor, the plurality of holding areas being formed within the frame for holding the plurality of prescription containers.*

2. [The collating unit as claimed in 1,] *A collating unit for automatically storing prescription containers dispensed by an automatic dispensing system, the collating unit comprising:*

*a storage unit for storing the containers delivered by an infeed conveyor;*

*a plurality of holding areas formed within the storage unit for holding the containers;*

*a plurality of guide arms mounted within the storage unit and operable to maneuver the containers from the infeed conveyor into the plurality of holding areas; and*

*a control system for controlling operation of the infeed conveyor and the plurality of guide arms;*

*wherein* the storage unit [including—a base positioned] *includes:*

*a collating unit conveyor* generally adjacent to the infeed conveyor; and

[a collating unit conveyor mounted on the base; and]

a frame substantially surrounding and covering [the infeed conveyor and] *at least a portion of* the collating unit conveyor*, the plurality of holding areas being formed within the frame for holding the containers*.

4. [The collating unit as claimed in claim 3,] *A collating unit for automatically storing prescription containers dispensed by an automatic dispensing system, the collating unit comprising:*

*a storage unit for storing the containers delivered by an infeed conveyor;*

*a plurality of holding areas formed within the storage unit for holding the containers;*

*a plurality of guide arms mounted with the storage unit and operable to maneuver the containers from the infeed conveyor into the plurality of holding areas; and*

*a control system for controlling operation of the infeed conveyor and the plurality of guide arms;*

*wherein the storage unit includes:*

*a base positioned generally adjacent to the infeed conveyor;*

*a collating unit conveyor mounted on the base; and,*

*a frame substantially surrounding and covering the infeed conveyor and the collating unit conveyor;*

*wherein the infeed conveyor is an outfeed conveyor of the automatic dispensing system; and* wherein the frame includes is longitudinal slot extending a length of the collating unit and formed within the frame such that when the frame is positioned over the infeed and collating unit conveyors, the longitudinal slot is generally positioned over the infeed conveyor.

* * * * *